United States Patent
Iwasaki et al.

(10) Patent No.: US 8,697,171 B2
(45) Date of Patent: *Apr. 15, 2014

(54) PREPARATION PROCESS OF PURIFIED GREEN-TEA EXTRACT

(75) Inventors: Masaki Iwasaki, Sumida-ku (JP); Norihiko Satake, Sumida-ku (JP); Shinji Yamamoto, Sumida-ku (JP); Naoki Hosoya, Sumida-ku (JP); Eiichi Hoshino, Sumida-ku (JP); Tetsuya Abe, Kamisu (JP); Hideaki Ueoka, Kamisu (JP); Eizo Maruyama, Kamisu (JP)

(73) Assignee: Kao Corporation, Tokyo (JP)

( * ) Notice: Subject to any disclaimer, the term of this patent is extended or adjusted under 35 U.S.C. 154(b) by 1368 days.

This patent is subject to a terminal disclaimer.

(21) Appl. No.: 11/511,321

(22) Filed: Aug. 29, 2006

(65) Prior Publication Data

US 2007/0059424 A1 Mar. 15, 2007

(30) Foreign Application Priority Data

| Sep. 1, 2005 | (JP) | 2005-253328 |
| Oct. 20, 2005 | (JP) | 2005-305246 |
| Jan. 30, 2006 | (JP) | 2006-21438 |

(51) Int. Cl.
| A23F 3/16 | (2006.01) |
| A23F 3/18 | (2006.01) |
| A23F 3/20 | (2006.01) |
| A23L 2/72 | (2006.01) |
| A23L 2/80 | (2006.01) |

(52) U.S. Cl.
USPC ........... 426/597; 426/425; 426/431; 426/435; 426/423; 426/422

(58) Field of Classification Search
USPC ......... 426/597, 423, 424, 422, 425, 427, 428, 426/431, 429, 435
See application file for complete search history.

(56) References Cited

U.S. PATENT DOCUMENTS

| 5,780,086 A * | 7/1998 | Kirksey et al. .............. 426/330.3 |
| 5,879,733 A * | 3/1999 | Ekanayake et al. ........... 426/271 |
| 6,797,305 B2 * | 9/2004 | Niino et al. .................... 426/435 |
| 2005/0095343 A1 * | 5/2005 | Ogura et al. .................. 426/597 |
| 2005/0163890 A1 * | 7/2005 | Otsuka et al. ................. 426/106 |
| 2005/0186314 A1 * | 8/2005 | Sasame et al. ................ 426/435 |

FOREIGN PATENT DOCUMENTS

| BE | 856955 A * | 1/1978 | | |
| DE | 2327935 A * | 1/1975 | | |
| EP | 423419 A * | 4/1991 | | |
| GB | 1043792 A * | 9/1966 | | |
| JP | 57029250 A * | 2/1982 | ................ A23F 3/20 |
| JP | 59219384 A * | 12/1984 | | |
| JP | 60156614 A * | 8/1985 | | |
| JP | 61289866 A * | 12/1986 | ................ A23L 2/38 |
| JP | 62278948 A * | 12/1987 | ................ A23F 3/20 |
| JP | 02128650 A * | 5/1990 | | |
| JP | 03133928 A * | 6/1991 | ............. A61K 31/35 |
| JP | 04045744 A * | 2/1992 | ................ A23F 3/20 |
| JP | 04311348 A * | 11/1992 | ................ A23F 3/16 |
| JP | 06142405 A * | 5/1994 | ............. B01D 15/00 |
| JP | 2002-238518 | 8/2002 | | |
| JP | 2002325539 A * | 11/2002 | | |
| JP | 2003144049 A * | 5/2003 | | |
| JP | 2003219799 A * | 8/2003 | | |
| JP | 2003219800 A * | 8/2003 | | |
| JP | 2003225053 A * | 8/2003 | | |
| JP | 2004222719 A * | 8/2004 | | |
| JP | 3590050 B1 * | 11/2004 | | |
| JP | 2004321105 A * | 11/2004 | | |
| JP | 2004337181 A * | 12/2004 | | |
| JP | 2005-58208 | 3/2005 | | |
| JP | 2005-58210 | 3/2005 | | |
| JP | 2005130809 A * | 5/2005 | | |
| JP | 2005-176666 | 7/2005 | | |
| JP | 2005176760 A * | 7/2005 | | |
| KR | 2005075044 A * | 7/2005 | | |
| WO | WO 03065817 A1 * | 8/2003 | | |
| WO | WO 2004037022 A1 * | 5/2004 | | |
| WO | WO 2005053415 A1 * | 6/2005 | | |

OTHER PUBLICATIONS

U.S. Appl. No. 12/297,529, filed Oct. 17, 2008, Abe , et al.
U.S. Appl. No. 12/297,452, filed Oct. 17, 2008, Abe , et al.
U.S. Appl. No. 12/300,800, filed Nov. 14, 2008, Satake, et al.
Office Action issued Aug. 17, 2010, in Japan Patent Application No. 2005-253328.

* cited by examiner

Primary Examiner — Viren Thakur
(74) Attorney, Agent, or Firm — Oblon, Spivak, McClelland, Maier & Neustadt, L.L.P.

(57) ABSTRACT

Provided are a preparation process of a purified green-tea extract capable of easily and efficiently removing a turbidity component contained in a green tea extract; a purified green-tea extract prepared by the preparation process; and a packaged beverage containing the purified green-tea extract. The preparation process of a purified green-tea extract containing, in the solid content thereof, from 36 to 99 mass % of non-polymer catechins comprises bringing a green tea extract into contact with a mixed solution containing an organic solvent and water at a mass ratio of from 65/35 to 97/3 and active carbon and/or acid clay or active clay, adjusting the organic solvent/water mass ratio of the resulting solution to from 0/100 to 85/15, and then separating the turbidity component thus separated.

6 Claims, No Drawings

PREPARATION PROCESS OF PURIFIED GREEN-TEA EXTRACT

TECHNICAL FIELD

The present invention relates to a preparation process of a purified green-tea extract having a reduced amount of a turbidity component; a purified green-tea extract prepared by the process; and a packaged beverage containing the extract.

BACKGROUND ART

Catechins are known to have a cholesterol-suppressing effect and an α-amylase activity inhibitory effect (Patent Documents 1 and 2). In order to obtain such physiological effects, an adult is required to drink four to five cups of tea a day. So there has been a demand for the development of a technology designed to incorporate catechins at a high concentration in beverages in order to facilitate the ingestion of a large amount of catechins. One of such methods is to add catechins in a dissolved form to a beverage by using a concentrate of a green tea extract (Patent Document 3) or the like.

In order to extract catechins having a stable taste from green tea, semi-fermented tea or fermented tea leaves, there are methods known as the two-stage extraction method in which extraction is performed with low-temperature water, followed by extraction under elevated temperature; and the extraction method to be performed in strong acidity (Patent Documents 4 to 6). The capability of such extraction methods, however, is limited to extracting catechins from tea leaves, and they are also intended only to stabilize the taste of a purified product and maintain a good taste.

Catechins are usually known to be sparingly soluble in an organic solvent, and their extraction can be accelerated under the weakly acidic conditions. Nonetheless, catechins have a problem that could lead to a critical decline in extraction efficiency when the proportion of an organic solvent is increased (Patent Document 7).

Not only does a tea leaf contain about 15 mass % of catechins, but it also contains caffeine in an mount of from 2 to 4 mass %. Caffeine has a central nervous stimulating activity and therefore can be used for warding off drowsiness. On the other hand, caffeine is said to have harmful effects such as jitteriness, vomiting and sleeplessness, if excessively used. Methods of selectively removing caffeine from a caffeine-containing composition have been investigated. Examples of such methods include a method in which caffeine is removed from coffee by bringing the coffee into contact with a caffeine adsorbent such as active carbon under atmospheric pressure of from 120 to 250 (Patent Document 8) and a method in which caffeine is selectively removed by bringing an aqueous solution containing caffeine into contact with active clay or acid clay (Patent Document 9). The former method, however, lacks simplicity in terms of the applicability on an industrial scale, because this method is related to a supercritical extraction technology and imposes a huge burden on its equipments during the process. Furthermore, there is a problem that although caffeine may be removed selectively by this method, it also brings noxious changes to the construction of catechins serving as an effective ingredient. The latter method, meanwhile, is accompanied with the problem that caffeine can be removed selectively only by using active carbon or acid clay, but the beverage thus obtained may have a deteriorated color.

[Patent Document 1] JP-A-60-156614
[Patent Document 2] JP-A-3-133928
[Patent Document 3] JP-A-59-219384
[Patent Document 4] JP-A-2003-219799
[Patent Document 5] JP-A-2003-219800
[Patent Document 6] JP-A-2003-225053
[Patent Document 7] JP-A-2004-147508
[Patent Document 8] JP-A-53-18772
[Patent Document 9] JP-A-6-142405

DISCLOSURE OF THE INVENTION

The present invention provides a preparation process of a purified green-tea extract containing, in the solid content thereof, from 36 to 99 mass % of non-polymer catechins, which comprises bringing a green tea extract in contact with a mixed solution containing an organic solvent and water at a mass ratio of from 65/35 to 97/3 and active carbon and/or acid clay or active clay, adjusting the organic solvent/water mass ratio in the resulting green tea extract solution to from 0/100 to 85/15, and separating therefrom a turbidity component thus precipitated in the solution.

The present inventors removed each component from a beverage containing a green tea extract and studied the relation between it and precipitation occurring in the beverage. As a result, it has been found that a turbidity component precipitated in a solution containing from 25 to 90 mass %, per solid content of the solution, of non-polymer catechins or turbidity components precipitated when a green tea extract dispersed in a mixed solution containing an organic solvent and water at a specific ratio is treated with active carbon and/or acid clay or active clay and then the organic solvent/water mass ratio is changed is a chief cause of precipitation occurring during storage of the beverage and that it can be removed efficiently by centrifugal separation and/or addition of a filter aid to the solution, followed by filtration through a filter precoated with the filter aid.

The purified green-tea extract of the present invention is prepared by a simple preparation process. Although the purified green-tea extract thus prepared has a low caffeine concentration and has a reduced amount of a turbidity component, it has still a high non-polymer catechin concentration, has a good color and gives almost no taste of a green tea.

A non-tea-based packaged beverage containing the green tea extract does not generate a precipitate derived from a turbidity component contained in the extract even after long-term storage and therefore has a clear and stable appearance. In addition, it has a good color, gives almost no taste of a green tea, does not leave a rough taste derived from the turbidity component and keeps providing such a feel even after long-term storage.

The present invention provides a preparation process of a purified green-tea extract, which comprises separating a solution containing from 25 to 90 mass %, per solid content thereof, of non-polymer catechins by centrifugal separation and/or addition of a filter aid to the solution, followed by filtration through a filter precoated with the filter aid.

The present invention also provides a preparation process of a purified green-tea extract, which comprises dispersing a green tea extract in a mixed solution containing an organic solvent and water at a mass ratio of 91/9 to 97/3, bringing the resulting dispersion into contact with active carbon and/or acid clay or active clay, adding water to the solution and/or removing the organic solvent from the solution to adjust the organic solvent/water mass ratio in the solution to fall within a range of form 70/30 to 40/60, and centrifuging the resulting solution and/or adding a filter aid to the solution and filtering the mixture through a filter precoated with the filter aid.

The present invention also provides a purified green-tea extract prepared by any one of the above-described preparation processes and a packaged beverage containing the extract.

DETAILED DESCRIPTION OF THE INVENTION

It has been elucidated that when a beverage containing a low-caffeine-content green-tea extract is stored for a long period of time, precipitation occurs gradually. Such precipitation occurring in the beverage is not visually beneficial, but becomes a problem when such a beverage is put on the market. Even a beverage having a large catechin content is therefore required to show a precipitation-free stable appearance.

An object of the present invention is to provide a preparation process of a purified green-tea extract capable of efficiently and easily removing a turbidity component contained in the green tea extract, a purified green-tea extract prepared by the preparation process, and a packaged beverage containing the extract.

The present inventors studied the relation between the precipitate generated in a beverage containing a green tea extract treated with active carbon and/or acid clay or active clay and purifying conditions of the green tea extract. As a result, it has been found that a turbidity component precipitated when an organic solvent and water are mixed at a specific mass ratio becomes a chief cause of precipitation occurring during the storage of the beverage. It has also been found that this turbidity component can be removed easily by changing the organic solvent/water mass ratio between at the time of contact with active carbon or the like and thereafter.

A tea-based packaged beverage, on the other hand, does not generate a precipitate derived from a turbidity component contained in the green tea extract even after long-term storage and therefore has a stable appearance. In addition, it has a good color, offers a fresh aroma specific to green tea and keeps such a fresh feel even after long-term storage.

The green tea extract to be used in the present invention contains at least a non-polymer catechin. The term "non-polymer catechin" as used herein is a generic term, which collectively encompasses non-epicatechins such as catechin, gallocatechin, catechin gallate and gallocatechin gallate, and epicatechins such as epicatechin, epigallocatechin, epicatechin gallate and epigallocatechin gallate.

The term "gallate percentage" as used herein means a total mass percentage of catechin gallate, gallocatechin gallate, epicatechin gallate and epigallocatechin gallate relative to the total mass of eight non-polymer catechins.

The green tea extract to be used in the present invention is obtained from tea leaves such as green tea, black tea and Oolong tea leaves. Mixtures of such a tea extract with caffeine of caffeine-containing plants such as coffee can also be employed. Specific examples of tea leaves used in the present invention include tea leaves available from the Genus *Camellia*, for example, *C. sinensis* and *C. assamica*, and the Yabukita variety, or hybrids thereof. Tea leaves manufactured from them include green teas such as sencha (middle-grade green tea), bancha (rough green tea), gyokuro (shaded green tea), tencha (powdered tea) and kamairicha (roasted tea). As such green tea extracts containing non-polymer catechins, those available by drying or concentrating an extract obtained from green tea leaves are preferred.

Extraction from tea leaves is carried out, for example, under stirring while using water as an extraction solvent. Upon extraction, an organic acid salt such as sodium ascorbate or organic acid may be added to water in advance. A process of extracting under so-called non-oxidizing atmosphere, more specifically, extracting while carrying out deaeration by boiling or passing an inert gas such as nitrogen, thereby eliminating dissolved oxygen may be used in combination. An extract obtained in such a manner is dried or concentrated, whereby a green tea extract to be used in the present invention can be obtained. The green tea extract may be in any one of the liquid, slurry, semi-solid and solid forms. From the viewpoint of dispersibility in an organic solvent such as ethanol, the extract in the slurry, semi-solid or solid form is preferred.

As the green tea extract to be used in the present invention, a concentrate of a green tea extract dissolved in water or diluted with water, or combination of an extract from tea leaves and the concentrate of a green tea extract may be used instead of using the extract from tea leaves after drying or concentration.

The term "concentrate of a green tea extract" means a concentrate of an extract which has been obtained by extracting tea leaves with hot water or a water soluble organic solvent. It is prepared by a process as described, for example, in JP-A-59-219384, JP-A-4-20589, JP-A-5-260907 or JP-A-5-306279. More specifically, as the green tea extract, rough catechin preparations such as "Polyphenon" of Tokyo Food Techno, "THEA-FLAN" of ITO EN, and "Sunphenon" of Taiyo Kagaku can be used as rough catechin preparations in the solid form.

As the green tea extract, an extract obtained using tea leaves subjected to contact treatment with carbon dioxide under a supercritical state may be employed. The tea leaves to be used for critical extraction may be any tea leaves insofar as they belong to the Genus *Camellia*. They may be either half-processed tea leaves or processed tea leaves. As the processed tea leaves, unfermented ones are especially preferred. Preferred examples of the processed tea leaves prepared by steaming include futsuu sencha, fukamushi sencha, gyokuro, kabusecha, gyokuryokucha and bancha, while examples of the processed tea leaves prepared by kiln drying include gyokuryokucha and Chinese green tea. As the processed tea leaves, those obtained by steaming or blanching (dipping) are preferable rather than those obtained by kiln drying because generation of another aroma derived from tea leaves can be suppressed in the former ones. In this process, an extract containing non-polymer catechins is obtained from tea leaves which have remained after supercritical extraction.

Use of an extract treated with tannase is especially preferred because a purified green-tea extract having greatly reduced bitterness or astringency is available by using tannase for the treatment. Any tannase is usable here insofar as it has degradation activity of non-polymer catechins. Specific examples of the usable tannase include those available by culturing tannase-producing microorganisms belonging to the genera *Aspergillus, Penicillium* and *Rhizopus*. Of these, tannase derived from the genera *Aspergillus oryzae* is preferred. To a green tea extract is added tannase in the powder or solution form to give a concentration of from 25 Unit/L to 500 Unit/L, preferably from 50 Unit/L to 150 Unit/L. Such an amount of tannase is 0.1 Unit or greater, preferably 0.2 Unit or greater in terms of 1 mg of the solid content. The term "1 Unit" as used herein is defined as an enzyme level capable of hydrolyzing, in water of 30° C., 1 µmol of an ester bond contained in tannic acid. The resulting mixture is kept at from 5 to 50° C., preferably from 10 to 40° C. until the gallate percentage reaches from 10 to 70 mass %.

The temperature is then elevated as quickly as possible to from 45 to 95° C., preferably from 75 to 95° C. to deactivate tannase, thereby terminating the reaction. A reduction in the gallate percentage thereafter can be prevented by this deactivation of the tannase and a green tea extract having a desired gallate percentage can be obtained.

In the tannase treatment of the present invention, the gallate percentage in the non-polymer catechins of the green tea extract thus obtained may be controlled to fall within a range of from 10 to 70 mass %, preferably from 30 to 60 mass % from the viewpoints of reduction in bitterness and good appearance. Different from the conventional treatment in which all the gallates contained in polymer catechins are hydrolyzed, the gallate percentage at the time of treatment is controlled in the tannase treatment conducted in the present invention. In the control of the gallate percentage by tannase treatment, the terminal point of the reaction is preferably determined by the pH behavior of the green tea extract at the time of treatment. The pH is preferably from 3 to 6, with from 3.5 to 5.5 being more preferred. This makes it possible to prepare a green tea extract subjected to tannase treatment by which the gallate content in the green tea extract is maintained within a desired range. In addition, by the deactivation of tannase after tannase treatment, a reduction in the gallate percentage thereafter can be prevented.

As the green tea extract to be used for the preparation of the purified green-tea extract of the invention, use of a concentrate of a green tea extract containing, on a dry weight basis, from 25 to 90 mass %, more preferably from 30 to 90 mass % of non-polymer catechins is preferred.

In the present invention, first, the green tea extract is brought into contact with a mixed solution containing an organic solvent and water at a weight ratio of from 97/3 to 65/35 and active carbon and/or acid clay or active clay.

Examples of the organic solvent to be used for the preparation of the purified green-tea extract of the invention include ethanol, methanol, acetone and ethyl acetate. Of these, hydrophilic organic solvents such as methanol, ethanol and acetone are preferred, of which ethanol is preferred in consideration of the addition to food. As water, ion exchange water, tap water and natural water can be used. Although the organic solvent and water may be mixed prior to use or individually mixed with the green tea extract, they are preferably added to the green tea extract as a mixed solution.

The organic solvent/water weight ratio is from 65/35 to 97/3, but is preferably adjusted to fall within a range of from 70/30 to 97/3, still more preferably from 75/25 to 97/3, still more preferably from 80/20 to 96.5/3.5. The weight ratio falling within the above-described range is preferred from the standpoints of the extraction efficiency of catechins, purification of the green tea extract, long-time suitability for drinking, and rectification conditions of the organic solvent collected.

In the preparation of the purified green-tea extract according to the present invention, the green tea extract (on a dry weight basis) is added preferably in an amount of from 10 to 40 parts by mass, more preferably from 10 to 30 parts by mass, even more preferably from 15 to 30 parts by mass, each based on 100 parts by mass of the mixed solution of an organic solvent and water, from the viewpoint of efficient treatment of the green tea extract.

The mixed solution of water and an organic solvent or each of them is preferably added dropwise slowly over about from 10 to 30 minutes. Dropwise addition under stirring is preferred to increase the extraction efficiency of the catechins. It is more preferred to conduct aging for about 10 to 120 minutes after the completion of the dropwise addition of water.

Such a treatment can be carried out at 10 to 60° C., preferably at 10 to 50° C., more preferably at 10 to 40° C.

Any active carbon can be used for the preparation of the purified green-tea extract of the present invention without particular limitation insofar as it is ordinarily used industrially. Commercially available products such as "ZN-50" (product of Hokuetsu Tansosha), "KURARAY COAL GLC, "KURARAY COAL PK-D" and "KURARAY COAL PW-D" (each, product of KURARAY CHEMICAL), and "Shirasagi AW50", "Shirasagi A", "Shirasagi M" and "Shirasagi C" (each, product of Takeda Pharmaceutical) can be used.

Active carbon has preferably a micropore volume of from 0.01 to 0.8 mL/g, more preferably from 0.1 to 0.7 mL/g, while it has preferably a specific surface area of from 800 to 1300 $m^2/g$, preferably from 900 to 1200 $m^2/g$. These physical properties are values based on the nitrogen adsorption method.

Active carbon is added preferably in an amount of from 0.5 to 5 parts by mass, more preferably from 0.5 to 3 parts by mass, to 100 parts by mass of the mixed solution of an organic solvent and water from the viewpoints of a caffeine removing efficiency and a small cake resistance in the filtration step.

Acid clay or active clay to be used for the preparation of the purified green tea extract of the present invention contains, as a usual chemical component, $SiO_2$, $Al_2O_3$, $Fe_2O_3$, CaO, MgO or the like. Its $SiO_2/Al_2O_3$ ratio is preferably from 3 to 12, more preferably from 4 to 9. A composition containing from 2 to 5 mass % of $Fe_2O_3$, from 0 to 1.5 mass % of CaO and from 1 to 7 mass % of MgO is preferred.

Active clay is a compound obtained by treating naturally produced acid clay (montmorillonite clay) with a mineral acid such as sulfuric acid and having a porous structure with a large specific surface area and adsorption capacity. It is known that acid treatment of acid clay changes its specific surface area, thereby improving the decoloring capacity and changing the physical properties.

The specific surface area of acid clay or active clay differs depending on the degree of acid treatment, but is preferably from 50 to 350 $m^2/g$. For example, commercially available "Mizuka Ace #600" (product of Mizusawa Industrial Chemicals) is usable as acid clay.

When active carbon is used in combination with acid clay or active clay, the active carbon:acid clay or active clay mass ratio falls preferably within a range of from 1:1 to 1:10, more preferably from 1:1 to 1:6.

Acid clay or active lay is added preferably in an amount of from 2.5 to 25 parts by mass, especially preferably from 2.5 to 15 parts by mass relative to 100 parts by mass of the mixed solution of an organic solvent and water. The amount of acid clay or active lay is too small, the caffeine removing efficiency lowers. An excessively large amount of it increases cake resistance in the filtration step. Amounts outside the above-described range are therefore not preferred.

No particular limitation is imposed on the contact order of the green extract, mixed solution of an organic solvent and water, and active carbon and/or acid clay or active clay in the preparation of the purified green-tea extract of the present invention. Preferred examples include (i) a method of dissolving or dispersing the green tea extract in the mixed solution of an organic solvent and water and then bringing the resulting mixture into contact with active carbon and/or acid clay or active clay; (ii) a method of bringing the green tea extract into contact with a dispersion obtained by dispersing active carbon and/or acid clay or active clay in the mixed solution of an organic solvent and water; and (iii) a method of bringing the green tea extract, the mixed solution of an organic solvent and water, and acid clay or active clay into contact with each other and then bringing them into contact with active carbon. A step of filtering the solution including a product generated in the system during these steps may be inserted between these steps, followed by the next step.

The step of bringing the solution into contact with active carbon may be carried out by separating a turbidity component, which has precipitated in the subsequent water addition and/or organic solvent removal step, while bringing it into contact with active carbon, or may be carried out after separating the precipitated turbidity component.

When the green tea extract is dispersed in the mixed solution of an organic solvent and water and then the resulting dispersion is brought into contact with active carbon and acid clay or active clay, no particular limitation is imposed on the dissolving method of the green tea extract in the mixed solution of an organic solvent and water. It is only necessary that the organic solvent/water mass ratio falls within a range of from 65/35 to 97/3 at the time of the final treatment of the green tea extract. For example, the organic solvent/water mass ratio may be adjusted to fall within a range of from 65/35 to 97/3 by adding the organic solvent after dissolution of the green tea extract in water, or after suspending the green tea extract in the organic solvent, water is added in portions to adjust the ratio to the above-described range.

In the present invention, when the green tea extract is mixed by bringing it into contact with a dispersion of acid clay or active clay in the mixed solution of an organic solvent and water, a mixing ratio (mass ratio) of the acid clay or active clay with the green tea extract is, in terms of acid clay or active clay/non-polymer catechins, preferably from 0.9 to 5.0, more preferably from 1.0 to 4.0, still more preferably from 1.5 to 3.0. An excessively small amount of acid clay or active clay may result in deteriorated caffeine removing efficiency, while an excessively large amount increases cake resistance in the filtration step. Amounts outside the above-described range are therefore not preferred.

When the green tea extract is brought into contact with acid clay or active clay, an organic acid such as citric acid, lactic acid, tartaric acid, succinic acid or malic acid may be added at an organic acid/non-polymer catechins mass ratio of from 0.01 to 0.20.

The temperature of the dispersion of active carbon and/or acid clay or active clay in the mixed solution of water and an organic solvent when the green-tea extract is brought into contact with the dispersion is preferably from 10 to 60° C. For example, the temperature may be fixed or may be increased from the first temperature set at from 10 to 30° C. to from 20 to 60° C.

The contact treatment of the green tea extract with active carbon and acid clay or active clay may be performed in either one of batch system or continuous treatment using a column. The green tea extract is preferably brought into contact with active carbon by the continuous treatment using a column of active carbon. Methods usually employed include a method of adding active carbon in the powder form to a green tea extract, stirring the mixture, selectively adsorbing caffeine to the active carbon, and obtaining a caffeine-removed filtrate by filtration; and a method of selectively adsorbing caffeine by the continuous treatment using a column filled with active carbon in the granular form or the like.

The mass ratio of the organic solvent to water may be adjusted to from 0/100 to 85/15 by bringing the green-tea extract into contact with a 65/35 to 97/3 (mass ratio) mixed solution of organic solvent and water and active carbon and/or acid clay or active clay, removing active carbon, acid clay and active clay if necessary, and then adding water to the resulting green tea extract solution and/or eliminating the organic solvent from the solution. Active carbon and the like may be removed in a known manner such as filtration or centrifugal separation. The organic solvent may be removed from the mixed solution or its content may be reduced by distilling off the organic solvent, for example, by distillation under reduced pressure. Water addition to the mixed solution after the contact treatment is carried out by adding water such as ion exchange water, tap water or natural water or an aqueous solution having an organic solvent mixed therein. In the present invention, the organic solvent/water mass ratio in the mixed solution is from 0/100 to 85/15, preferably from 0/100 to 80/20, more preferably from 0/100 to 75/25, still more preferably from 0/100 to 70/30, still more preferably from 0.3/99.7 to 70/30, still more preferably from 0.5/99.5 to 70/30, yet still more preferably form 0.5/99.5 to 65/35. When the organic solvent/water mass ratio is below 40/60, the amount of the turbidity component thus precipitated increases but the dispersibility of them also increases. Use of a separator with a high load may therefore be employed in such a case.

No particular limitation is imposed on the aging time to precipitate the turbidity component after addition of water and/or removal of the organic solvent. For example, it is preferably from 2 minutes to 50 hours, more preferably from 2 minutes to 24 hours, even more preferably from 5 minutes to 6 hours. The precipitation temperature of the turbidity component is preferably from −15 to 78° C., more preferably from −5 to 40° C., even more preferably from 5 to 25° C.

The temperature at the time when the turbidity component thus precipitated is separated from the mixed solution is preferably from −15 to 78° C., more preferably from −5 to 40° C., even more preferably from 5 to 25° C. The temperatures outside the above-described range may disturb the separation or may cause some changes in the properties of the solution.

A known technology can be applied to the separation of the precipitated turbidity component. Separation can be carried out, for example, by precipitation, centrifugal force, filtration or an adsorbent. In addition to the methods such as filtration (separation by filtration) and centrifugal separation, separation may be effected by passing through a column filled with granular substances such as active carbon. This separation is carried out not to remove foreign matters mixed in during preparation but to separate the precipitated turbidity component by increasing the polarity of the solution during purification. Among the above-described methods, filtration or centrifugal separation, or combined use thereof is preferred.

In the present invention, it is preferred to separate the precipitated turbidity component by centrifugal separation and/or addition of a filter aid to the mixed solution, followed by filtration through a filter precoated with the filter aid.

As a centrifugal separator to be used for the separation of the turbidity component thus precipitated, a continuous centrifugal separator such as decanter type or disc type can be employed. As the centrifugal separator, a disc type one which is equipped with a group of discs stacked one after another in a rotating system and carries out separation while utilizing a large equivalent sedimentation area is preferred. When the disc type centrifugal separator is employed, a equivalent sedimentation area ($\Sigma m^2$)/solution flow rate ($Qm^3/h$) ratio ($Q/\Sigma$) thereof is preferably from $2.5\times10^{-6}$ to $5.0\times10^{-5}$ m/h, more preferably from $7.5\times10^{-6}$ to $4.0\times10^{-5}$, especially preferably from $1.0\times10^{-5}$ to $3.0\times10^{-5}$ m/h.

When the precipitated turbidity component is filtered through a filter precoated with a filter aid, the filter aid is preferably added to the mixed solution in advance. As the filter aid for precoating and addition, diatomaceous earth or cellulose or combination thereof can be used. The filter is, for example, a filter cloth or filter paper. The thickness of the precoat layer is preferably from 3 to 50 mm, more preferably from 10 to 40 mm, especially preferably from 15 to 30 mm. The amount of the filter aid to be added is preferably from 1 to 30 parts by mass, more preferably from 2 to 15 parts by mass, even more preferably from 2 to 5 parts by mass to 100 parts by mass of the mixed solution. Filtering speed is preferably from 500 to 7000 L/m²·h, more preferably from 1000 to 4500 L/m²·h. Examples of the filtering method include pressure filtration, suction filtration and centrifugal filtration.

Of the invention processes, a preparation process of a purified green-tea extract which comprises separating a solution containing from 25 to 90 mass %, per solid content thereof, of non-polymer catechins by centrifugal separation and/or addition of a filter aid to the solution, followed by filtration through a filter precoated with the filter aid will next be described.

The green tea extract employed here is similar to that described above.

The purified green-tea extract of the present invention is prepared by separating a solution containing from 25 to 90 mass %, per solid content thereof, of non-polymer catechins by centrifugal separation and/or addition of a filter aid to the solution, followed by filtration through a filter precoated with the filter aid.

The purified green-tea extract of the invention is also prepared by dispersing the green tea extract in a mixed solution containing an organic solvent and water at a mass ratio of from 91/9 to 97/3, bringing the resulting dispersion into contact with active carbon and/or acid clay or active clay, adjusting the organic solvent/water mass ratio in the solution to fall within a range of from 70/30 to 40/60 by the addition of water and/or removal of the organic solvent; and centrifuging the turbidity component thus precipitated and/or adding a filter aid to the solution and filtering the resulting mixture through a filter precoated with the filter aid. As the green tea extract, a concentrate of a green tea extract containing, on a dry weight basis, preferably from 25 to 90 mass %, more preferably from 30 to 90 mass % of non-polymer catechins is preferred.

Examples of the organic solvent to be used for the preparation of the purified green-tea extract of the invention include ethanol, methanol, acetone and ethyl acetate. Of these, hydrophilic organic solvents such as methanol, ethanol and acetone are preferred, of which ethanol is preferred in consideration of the addition to food. As water, ion exchange water, tap water and natural water can be used. Although the organic solvent and water may be mixed prior to use or individually mixed with the green tea extract, they are preferably added to the green tea extract as a mixed solution.

When the green tea extract is dispersed in the mixed solution of an organic solvent and water in the present invention, the organic solvent/water mass ratio is adjusted to fall within a range of from 91/9 to 97/3, preferably from 91/9 to 95/5, still more preferably from 92/8 to 95/5. Ratios of the organic solvent exceeding 97/3 reduce the extraction efficiency of catechins, while ratios below 91/9 deteriorate the purification degree of the green tea extract. Ratios outside the above-described range are therefore not preferred.

In the present invention, no particular limitation is imposed on the dispersing method of the green tea extract in the mixed solution of an organic solvent and water. It is only necessary that the organic solvent/water mass ratio falls within a range of from 91/9 to 97/3 at the time of the final treatment of the caffeine-containing catechin composition. For example, the organic solvent/water mass ratio may be adjusted to fall within a range of from 91/9 to 97/3 by adding the organic solvent after dissolution of the green tea extract in water, or by adding water in portions after suspending the green tea extract in the organic solvent. From the viewpoint of the extraction efficiency, addition of the organic solvent after dissolution in water is preferred. The green tea extract may be added in one portion or two or more portions, for example, in two to four portions.

In the present invention, addition of the green tea extract in an amount of from 10 to 40 parts by mass, preferably from 10 to 30 parts by mass, on a dry weight basis, to 100 parts by mass of the mixed solution of an organic solvent and water is preferred because such an amount enables efficient treatment of the green tea extract.

The mixed solution of water and an organic solvent or each of them is preferably added dropwise slowly over about from 10 to 30 minutes. Dropwise addition under stirring is preferred to increase the extraction efficiency of the catechins. It is more preferred to conduct aging for from about 10 to 120 minutes after the completion of the dropwise addition of water.

Such a treatment can be carried out at from 10 to 60° C., preferably at from 10 to 50° C., more preferably at from 10 to 40° C.

Any active carbon can be used for the preparation of the purified green-tea extract of the present invention without particular limitation insofar as it is ordinarily used industrially. Commercially available products such as "ZN-50" (product of Hokuetsu Tansosha), "KURARAY COAL GLC, "KURARAY COAL PK-D" and "KURARAY COAL PW-D" (each, product of KURARAY CHEMICAL), and "Shirasagi AW50", "Shirasagi A", "Shirasagi M" and "Shirasagi C" (each, product of Takeda Pharmaceutical) can be used.

Active carbon has preferably a micropore volume of from 0.01 to 0.8 mL/g, more preferably from 0.1 to 0.7 mL/g, while it has preferably a specific surface area of from 800 to 1300 m²/g, preferably from 900 to 1200 m²/g. These physical properties are values based on the nitrogen adsorption method.

Active carbon is added preferably in an amount of from 0.5 to 5 parts by mass, more preferably from 0.5 to 3 parts by mass, to 100 parts by mass of the mixed solution of an organic solvent and water. Unduly small amounts of active carbon deteriorate the caffeine removal efficiency, while unduly large amounts of it increase the cake resistance during filtration. Amounts outside the above-described range are therefore not preferred.

Acid clay or active clay to be used for the preparation of the purified green tea extract of the present invention contains, as a usual chemical component, $SiO_2$, $Al_2O_3$, $Fe_2O_3$, CaO, MgO or the like. Its $SiO_2/Al_2O_3$ ratio is preferably from 3 to 12, especially preferably from 4 to 9. A composition containing from 2 to 5 mass % of $Fe_2O_3$, from 0 to 1.5 mass % of CaO and from 1 to 7 mass % of MgO is preferred.

Active clay is a compound obtained by treating naturally produced acid clay (montmorillonite clay) with a mineral acid such as sulfuric acid and having a porous structure with a large specific surface area and adsorption capacity. It is known that acid treatment of acid clay changes its specific surface area, thereby improving the decoloring capacity and changing the physical properties.

The specific surface area of acid clay or active clay differs depending on the degree of acid treatment, but is preferably from 50 to 350 m²/g. Its pH (in a 5 mass % suspension) is from 2.5 to 8, preferably from 3.6 to 7. For example, commercially available "Mizuka Ace #600" (product of Mizusawa Industrial Chemicals) is usable as acid clay.

Acid clay or active clay is added preferably in an amount of from 2.5 to 25 parts by mass, more preferably from 2.5 to 15 parts by mass to 100 parts by mass of the mixed solution of an organic solvent and water. Unduly small amounts of acid clay or active clay deteriorate the caffeine removal efficiency, while unduly large amounts increase the cake resistance during the filtration step. Amounts outside the above-described range are therefore not preferred.

When active carbon is used in combination with acid clay or active clay, the active carbon:acid clay or active clay mass ratio is preferably 1:1 to 1:10, more preferably 1:1 to 1:6.

No particular limitation is imposed on the contact order of the green extract, mixed solution of an organic solvent and water, and active carbon and/or acid clay or active clay in the preparation of the purified green-tea extract of the present invention. Examples include (1) a method of adding the green tea extract to the mixed solution of an organic solvent and water and then bringing the resulting mixture into contact with active carbon and then, acid clay or active clay; (2) a method of adding the green tea extract to the mixed solution of an organic solvent and water and then bringing the resulting mixture into contact with acid clay or active clay, and then active carbon; and (3) a method of adding active carbon to the mixed solution of an organic solvent and water, adding the green tea extract to the resulting mixture, and then adding acid clay or active clay. Preferred is (4) a method of adding acid clay or active clay to the mixed solution of an organic solvent and water, adding the green tea extract to the resulting mixture and then adding active carbon.

Between the addition of each component and addition of the next component, filtration is preferably performed. When the green tea extract is added in two or more portions, filtration may be performed between them.

In the present invention, when the green tea extract is brought into contact with a dispersion of acid clay or active clay in the mixed solution of an organic solvent and water, the pH at the time of contact is adjusted to from 4 to 6. This adjustment is preferred for obtaining a purified green-tea extract in which non-polymer catechins have been extracted efficiently. At the time of contact, addition of an organic acid such as citric acid, lactic acid, tartaric acid, succinic acid or malic acid at a mass ratio (organic acid/non-polymer catechins) of from 0.02 to 0.20 is preferred.

In the present invention, when the green tea extract is brought into contact with the dispersion of acid clay or active clay in the mixed solution of water and an organic solvent, the temperature upon contact is first set at from 10 to 30° C. and then increased to from 20 to 60° C. Such a temperature setting is preferred because it accelerates the dissolution of the green tea extract and also accelerates the catechin extraction efficiency in the dispersion.

In the present invention, it is preferred to disperse the green tea extract in a mixed solution containing an organic solvent and water at a mass ratio of from 91/9 to 97/3, bringing the resulting dispersion into contact with active carbon and/or acid clay or active clay, filtering the solution, and adding water to the filtrate and/or removing the organic solvent from the filtrate.

The contact with active carbon may be performed prior to the subsequent step, that is, addition of water and/or removal of an organic solvent, or may be performed after addition of water and/or removal of an organic solvent to separate the turbidity component thus precipitated.

The contact treatment of the green tea extract with active carbon and acid clay or active clay may be performed by either one of batch system or continuous treatment using a column. The contact of the green tea extract with active carbon is preferably performed by the continuous treatment using an active carbon column. Methods usually employed include a method of adding active carbon in the powder form to the green tea extract, stirring the mixture, selectively adsorbing caffeine to the active carbon, and obtaining a caffeine-removed filtrate by filtration; and a method of selectively adsorbing caffeine by the continuous treatment through a column filled with active carbon in the granular form or the like.

After the green tea extract is brought into contact with the mixed solution of an organic solvent and water and active carbon and/or acid clay or active clay and active carbon and acid clay or active clay are removed if necessary in a known manner such as filtration, water is added to the mixed solution and/or the organic solvent is eliminated from the mixed solution so as to adjust the organic solvent/water mass ratio in the mixed solution to fall within a range of from 70/30 to 40/60, preferably from 60/40 to 45/55. The content of the organic solvent in the mixed solution is reduced by distilling off the organic solvent, for example, by distillation under reduced pressure. Water addition to the mixed solution after the contact treatment is carried out by adding water such as ion exchange water, tap water or natural water.

No particular limitation is imposed on the aging time to precipitate the turbidity component after addition of water and/or removal of the organic solvent. For example, it is preferably from 2 minutes to 50 hours, more preferably from 2 minutes to 24 hours, even more preferably from 5 minutes to 6 hours. The precipitation temperature of the turbidity component is preferably from −15 to 78° C., more preferably from −5 to 40° C., even more preferably from 5 to 25° C.

The temperature at the time when the turbidity component is separated from the mixed solution after the precipitation of the turbidity component is preferably from −15 to 78° C., more preferably from −5 to 40° C., even more preferably from 5 to 25° C. The temperatures outside the above-described range may disturb the separation or may cause some changes in the properties of the solution.

In the present invention, the turbidity component thus precipitated is separated by centrifugal separation and/or addition of a filter aid to the mixed solution, followed by filtration through a filter precoated with the filter aid.

As a centrifugal separator to be used for the separation of the turbidity component thus precipitated, a continuous centrifugal separator such as decanter type or disc type can be employed. As the centrifugal separator, a disc type one which is equipped with a group of discs stacked one after another in a rotating system and carries out separation while utilizing a large equivalent sedimentation area is preferred. When the disc type centrifugal separator is employed, a equivalent sedimentation area ($\Sigma m^2$)/solution flow rate ($Qm^3/h$) ratio ($Q/\Sigma$) thereof is preferably from $2.5\times10^{-6}$ to $5.0\times10^{-5}$ m/h, more preferably from $7.5\times10^{-6}$ to $4.0\times10^{-5}$, even more preferably from $1.0\times10^{-5}$ to $3.0\times10^{-5}$ m/h.

When the precipitated turbidity component is filtered through a filter precoated with a filter aid, the filter aid is preferably added to the mixed solution in advance. As the filter aid for precoating and addition, diatomaceous earth or cellulose or combination thereof can be used. The filter is, for example, a filter cloth or filter paper. The thickness of the precoat layer is preferably from 3 to 50 mm, more preferably from 10 to 40 mm, even more preferably from 15 to 30 mm. The amount of the filter aid to be added is preferably from 1 to 30 parts by mass, more preferably from 2 to 15 parts by mass, even more preferably from 2 to 5 parts by mass to 100 parts by mass of the mixed solution. Filtering speed is preferably from 500 to 7000 $L/m^2\cdot h$, more preferably from 1000 to 4500 $L/m^2\cdot h$. Examples of the filtering method include pressure filtration, suction filtration and centrifugal filtration.

A solution of the green tea extract obtained by bringing the green tea extract into contact with the mixed solution of an organic solvent and water and active carbon and/or acid clay or active clay, adding water and/or removing the solvent from the mixed solution, separating the turbidity component thus precipitated and optionally bringing the residue into contact with active carbon further is distilled, for example, by distillation under reduced pressure to remove the organic solvent from the system. The green tea extract after this treatment may be either in the liquid form or solid form. When the green tea extract in the solid form is prepared, it may be converted into powder by freeze drying or spray drying.

The purified green-tea extract prepared in such a preparation process contains, in the solid content thereof, from 36 to 99 mass %, preferably from 39 to 99 mass %, more preferably from 40 to 90 mass %, still more preferably from 45 to 90 mass %, still more preferably from 50 to 90 mass %, still more preferably from 55 to 90 mass %, yet still more preferably from 55 to 88 mass % of non-polymer catechins. Moreover, the purified green-tea extract preferably contains free amino acids and proteins in a total amount of from 0 to 5.0 mass % in the solid content of the extract. A mass ratio of non-polymer catechins to the total amount of free amino acids and proteins (non-polymer catechins/(free amino acids+proteins)) is preferably from 15 to 25.

The purified green-tea extract prepared by the present invention preferably undergoes no essential change in the composition of non-polymer catechins contained in the extract compared with that before the treatment. The yield of the non-polymer catechins in the mixed solution of an organic solvent and water before or after the treatment is preferably from 60 mass % or greater, more preferably 65 mass % or greater, still more preferably 70 mass % or greater, yet still more preferably 80 mass % or greater.

A percentage, in the total non-polymer catechins, of the gallates composed of catechin gallate, epicatechin gallate, gallocatechin gallate and epigallocatechin gallate contained in the purified green-tea extract is preferably from 35 to 100 mass %, more preferably from 35 to 98 mass % from the viewpoint of effectiveness of the physiological effects of the non-polymer catechins.

The mass ratio of caffeine to the non-polymer catechins contained in the purified green-tea extract is preferably from 0 to 0.2, more preferably from 0 to 0.14, still more preferably from 0 to 0.1, still more preferably from 0 to 0.09, still more preferably from 0 to 0.07, yet still more preferably from 0 to 0.06.

The haze of the purified green-tea extract of the present invention as a 10 mass %, in terms of non-polymer catechins (A), aqueous solution is 0 to 70, preferably from 0 to 65, more preferably from 0 to 60, still more preferably from 0 to 55, still more preferably form 0 to 50, still more preferably from 0 to 45, yet still more preferably from 0 to 40.

A non-tea-based packaged beverage using the purified green-tea extract having the haze value within the above-described range does not cause precipitation due to turbidity contained in the green tea extract even after storage for long hours and it becomes a beverage having a clear and stable appearance. In addition, it has good color and hardly provides a taste of green tea.

A tea-based packaged beverage, on the other hand, does not cause precipitation due to turbidity contained in the green tea extract even after storage for long hours and becomes a beverage having a stable appearance. Moreover, it has a good color and offers a fresh aroma specific to green tea.

A non-tea-based packaged beverage having a haze outside the above-described range causes precipitation due to turbidity after storage for long hours. It loses a clear and stable appearance and moreover, rough taste derived from the turbidity component increases during the long-term storage, resulting in less preference for the beverage. In a tea-based packaged beverage, rough taste derived from the turbidity component increases during long-term term storage and loses fresh aroma of a green tea, resulting in less preference for the beverage.

Although the purified green-tea extract thus obtained has a low caffeine concentration and has a reduced turbidity component, it maintains a high non-polymer catechin concentration, has a good color and provides almost no taste of green tea. The purified green tea extract thus obtained having a reduced turbidity component is therefore useful for a packaged beverage, particularly useful for a tea beverage such as green tea, Oolong tea, blend tea, black tea or barley tea, and non-tea beverage such as sports drink, isotonic drink, near water, carbonated beverage, vegetable juice, fruits juice or coffee.

The packaged beverage according to the present invention contains the non-polymer catechins, which have been dissolved in water, from 0.03 to 1.0 mass %, preferably from 0.04 to 0.5 mass %, more preferably from 0.06 to 0.4 mass %, still more preferably from 0.07 to 0.4 mass %, still preferably from 0.08 to 0.3 wt %, still more preferably from 0.09 to 0.3 mass %, yet still more preferably from 0.1 to 0.3 mass %. The contents of the non-polymer catechins falling within the above-described ranges are preferred because a large amount of the non-polymer catechins can be taken easily and in addition, the color tone of the beverage just after preparation is good. The concentration of the non-polymer catechins can be adjusted by the amount of the purified green-tea extract having a reduced turbidity component.

A daily intake of non-polymer catechins per adult sufficient to exhibit effects for the promotion of accumulated fat oxidation, promotion of dietary fat oxidation and promotion of hepatic $\beta$-oxidation gene expression is preferably 300 mg or greater, more preferably 450 mg or greater, still more preferably 500 mg or greater. More specifically, it has been confirmed (in JP-A-2002-326932) that drinking of a beverage (500 mL) containing 483 mg, 555 mg or 900 mg of non-polymer catechins has an anti-obesity effect or visceral fat reducing effect.

Accordingly, a daily intake per adult of the packaged beverage according to the present invention is, in terms of non-polymer catechins, preferably 300 mg or greater, more preferably 450 mg or greater, still more preferably 500 mg or greater. In order to assure the daily necessary intake per adult, the packaged beverage (500 mL) of the present invention contains preferably 300 mg or greater, more preferably 450 mg or greater, still more preferably 500 mg or greater of the non-polymer catechins.

In the packaged beverage of the present invention, a mass ratio of caffeine and non-polymer catechins contained therein is from 0 to 0.2, preferably from 0 to 0.14, more preferably from 0 to 0.1, still more preferably from 0 to 0.09, still preferably from 0 to 0.07, yet still more preferably from 0 to 0.06.

The packaged beverage of the present invention may contain a sodium ion and/or potassium ion. The beverage of the present invention having such an ion incorporated therein is useful as a drink type such as sports drink and isotonic drink. The term "sports drink" is usually defined as a drink capable of rapidly replenishing water and minerals which have been lost as sweat after physical exercise.

Sodium and potassium are primary physiological electrolytes. These ion components can be incorporated in the packaged beverage by adding water soluble components or inorganic salts corresponding to them. They are also present in juices and green tea extracts. The amount of an electrolyte or ion component in the beverage of the present invention is its content in the final packaged beverage provided for drinking. The concentration of each electrolyte is expressed in terms of "ion concentration". A potassium ion component may be mixed in the form of potassium chloride, potassium carbonate, potassium sulfate, potassium acetate, potassium hydrogencarbonate, potassium citrate, potassium phosphate, potassium hydrogenphosphate, potassium tartrate or potassium sorbate, or a mixture thereof such as a salt, or as a fruit juice or tea component. The packaged beverage of the present invention contains potassium ions preferably in an amount of from 0.001 to 0.2 mass %, more preferably from 0.002 to 0.15 mass %, still more preferably from 0.003 to 0.12 mass %. A sodium ion component may be mixed in the form of sodium chloride, sodium carbonate, sodium hydrogencarbonate, sodium citrate, sodium phosphate, sodium hydrogenphosphate, sodium tartrate or sodium benzoate or a mixture thereof such as easily available sodium salt, or as a fruit juice or tea component. A lower sodium concentration is desired because it facilitates absorption of water under osmotic pressure. The sodium concentration is however added preferably in an amount not to cause suction of water from the body to the intestine under osmotic pressure. The concentration of sodium necessary for it is preferably lower than the plasma sodium. The packaged beverage of the present invention contains sodium ions preferably in an amount of from 0.001 to 0.5 mass %, more preferably from 0.002 to 0.4 mass %, still more preferably from 0.003 to 0.2 mass %. The packaged beverage of the present invention may contain, in addition to potassium and sodium ions, chloride ions preferably in an amount of from 0.001 to 0.5 mass %, more preferably from 0.002 to 0.4 mass %, even more preferably from 0.003 to 0.3 mass %. Chloride ions may be mixed in the form of a salt such as sodium chloride or potassium chloride. Further, trace ions such as calcium, magnesium, zinc and/or iron ions may also be mixed. These ions may also be mixed in the form of a salt. The total amount of ions present in the beverage preferably includes an added amount of ions and an amount of ions naturally existing in the beverage. When sodium chloride is added, for example, the amounts of sodium ions and chloride ions in the sodium chloride thus added are included in the total amount of ions present in the beverage.

When the sodium ion or potassium ion concentration is unduly small, the resulting beverage does not leave a satisfactory feeling in taste and cannot replenish minerals effectively. When it is unduly large, on the other hand, a taste of a salt becomes prominent and such a beverage is not suited for long-term drinking.

In the packaged beverage according to the present invention, a sweetener may be added to improve its taste. Usable examples of the sweetener include artificial sweeteners, carbohydrates, and glycerols (for example, glycerin). The content of such a sweetener in the packaged beverage of the present invention is preferably from 0.0001 to 20 mass %, more preferably from 0.001 to 15 mass %, still more preferably from 0.001 to 10 mass % from the viewpoints of the balance among sweetness, sourness and saltiness and sweetness mild enough to prevent feeling that the sweetness gets stuck in the throat and facilitate smooth drinking.

As sweeteners usable in the packaged beverage of the present invention, artificial sweeteners are preferred. Artificial sweeteners usable in the present invention include, for example, high-sweetness sweeteners such as saccharin, saccharin sodium, aspartame, acesulfame-K, sucralose and neotame; and sugar alcohols such as sorbitol, erythritol and xylitol. As commercial products, "SLIM-UP SUGAR" composed of aspartame, "LAKANTO-S" containing erythritol, and "PALSWEET" composed of erythritol and aspartame are usable.

When the packaged beverage of the present invention is an energy boosting one, the sweetener in the packaged beverage can preferably be a carbohydrate sweetener. The carbohydrate sweeteners usable in the present invention are soluble carbohydrates. Soluble carbohydrates generally play a dual role as a sweetener and an energy source. When a carbohydrate for use in the beverage of the present invention is selected, it is preferred to consider a sufficient gastric emptying rate and intestinal absorption rate.

The carbohydrate may be a mixture of glucose and fructose, a carbohydrate hydrolyzable in the digestive tract, or a carbohydrate capable of forming glucose and fructose. The term "carbohydrate" as used herein includes monosaccharides, disaccharides, oligosaccharides and complex polysaccharides, and mixtures thereof.

Monosaccharides usable here include, for example, tetroses, pentoses, hexoses and ketohexoses. Examples of the hexoses include aldohexoses such as glucose known as grape sugar. The content of glucose in the packaged beverage of the present invention is preferably from 0.0001 to 20 mass %, more preferably from 0.001 to 15 mass %, still more preferably from 0.001 to 10 mass %. Fructose known as fruit sugar is a ketohexose. The content of fructose in the packaged beverage of the present invention is preferably from 0.0001 to 20 mass %, more preferably from 0.001 to 15 mass %, still more preferably from 0.001 to 10 mass %.

In the beverage of the present invention, single use of an artificial sweetener, or combined use of an artificial sweetener and a glucose compound or an artificial sweetener and a fructose compound is preferred.

As the carbohydrate sweetener, a soluble carbohydrate can be used in the present invention. Examples of the oligosaccharide include carbohydrates (that is, sucrose, maltodextrin, corn syrup, and fructose-rich corn syrup) capable of forming these two monosaccharides in vivo. Disaccharides are important as oligosaccharides. Examples of the disaccharide include sucrose known as cane sugar or beet sugar. The content of sucrose in the packaged beverage of the present invention is preferably from 0.001 to 20 mass %, more preferably from 0.001 to 15 mss %, still more preferably from 0.001 to 10 mass %.

The packaged beverage of the present invention has preferably a pH of from 2 to 7, more preferably from 2 to 6.7, still more preferably from 2.5 to 6.5 from the viewpoint of stability of catechins. The beverage having an unduly low pH has strong sourness and emits an offensive odor. When the beverage has an unduly high pH, on the other hand, it loses balance of a taste and preference for it lowers. The pH outside the above-described range is therefore not preferred.

Addition of a bitterness and astringency suppressor to the packaged beverage of the present invention is preferred because it smoothens drinking. Although no particular limitation is imposed on the bitterness and astringency suppressor, a cyclodextrin is preferred. As the cyclodextrin, an α-, β- or γ-cyclodextrin or a branched α-, β- or γ-cyclodextrin may be used. In the packaged beverage of the present invention, a cyclodextrin may be added preferably in an amount of from 0.005 to 0.5 mass %, preferably from 0.01 to 0.3 mass %. To the packaged beverage of the present invention, it is possible to add, either singly or in combination, additives such as antioxidants, flavors, various esters, organic acids, organic acid salts, inorganic acids, inorganic acid salts, inorganic salts, colorants, emulsifiers, preservatives, seasoning agents, sweeteners, acidulants, gums, emulsifiers, oils, vitamins, amino acids, fruit extracts, vegetable extracts, flower honey extracts, pH regulators, quality stabilizers, and the like.

In the packaged beverage of the present invention, flavors and fruit juices are preferably added to improve its taste. Natural or synthetic flavors and fruit juices may be used in the present invention. They can be selected from fruit juices, fruit flavors and plant flavors, and mixtures thereof. For the development of attractive tastes, preferred are combinations of fruit juice and tea flavor, preferably green tea or black tea flavor. Preferred examples of the fruit juice include apple, pear, lemon, lime, mandarin, grapefruit, cranberry, orange, strawberry, grape, kiwi, pineapple, passion fruit, mango, guava, raspberry and cherry juices. Of these, citrus juices, preferably, grapefruit, orange, lemon, lime and mandarin juices, mango juice, passion fruit juice and guava juice are preferred, with the mixtures thereof being more preferred. Preferred examples of natural flavors include jasmine, chamomile, rose, peppermint, Crataegus cuneata, chrysanthemum, water caltrop, sugarcane, lychee, and bamboo shoot. The juice is added to the beverage of the present invention preferably in an amount of from 0.001 to 20 mass %, more preferably from 0.002 to 10 mass %. Fruits flavor, plant flavor and tea flavor, and mixtures thereof may also be used as the juice. Preferred flavors include citrus flavors including orange flavor, lemon flavor, lime flavor and grapefruit flavor. In addition to such citrus flavors, various other fruits flavors such as apple flavor, grape flavor, raspberry flavor, cranberry flavor, cherry flavor and pineapple flavor are also usable. These flavors may be derived from natural sources such as fruit juices and balms, or may be synthesized. The term "flavor" as used herein embraces blends of various flavors, for example, a blend of lemon and lime flavors and blend of a citrus flavor and selected spice. Such a flavor can be mixed preferably in an amount of from 0.0001 to 5 mass %, more preferably from 0.001 to 3 mass % in the beverage of the present invention.

Examples of an extract available from a portion of plants other than fruits include plant extracts available from nuts, barks, roots and leaves, more specifically, coffee bean extract, fermented tea extract, semi-fermented tea extract, and unfermented tea extract. These extracts may be either those available from natural sources or those available by synthesis. When an unfermented tea extract is added, its amount is preferably controlled to 70 mass % or less, especially 60 mass % or less based on the total mass of catechins in the packaged beverage. When a semi-fermented tea extract is added, its amount is controlled to 50 mass % or less, more preferably 30 mass % of less, even more preferably 20 mass % or less based on the total mass of catechins in the packaged beverage. When a fermented tea extract is added, its amount is preferably controlled to 25 mass % of less, more preferably 20 mass % or less, even more preferably 15 mass % or less based on the total mass of catechins in the packaged beverage. These tea extracts added as a flavoring substance contain non-polymer catechins so that the amount of the non-polymer catechins in such an additive is also calculated as Component (A). The vegetable extract may be any extract available from a portion of a vegetable such as cabbage, lettuce, tomato, Japanese radish, broccoli, carrot, pumpkin and spinach. Either the vegetable extract available from natural sources or that by synthesis is usable.

The packaged beverage according to the present invention may also contain an acidulant as needed. Examples of the acidulant include edible acids such as malic acid, citric acid, tartaric acid and fumaric acid. The acidulant may also be used to regulate the pH of the packaged beverage according to the present invention. The beverage of the present invention has preferably a pH of from 2 to 7. As a pH regulator, an organic or inorganic edible acid may be used. The acid may be used either in a non-dissociated form or in the form of its salt. Examples of the salt include potassium hydrogenphosphate, sodium hydrogenphosphate, potassium dihydrogenphosphate, and sodium dihydrogenphosphate. Preferred acids include edible organic acids such as citric acid, malic acid, fumaric acid, adipic acid, phosphoric acid, gluconic acid, tartaric acid, ascorbic acid, acetic acid and malic acid, and mixtures thereof, with citric acid and malic acid being preferred. An acidulant is also useful as an antioxidant for stabilizing the components in the beverage. Examples of commonly employed antioxidants include ascorbic acid and EDTA (ethylenediaminetetraacetic acid) and salts thereof, and plant extracts.

The packaged beverage of the present invention may contain vitamins further. Preferred vitamins include vitamin A, vitamin C, and vitamin E. Other vitamins such as vitamin D and vitamin B may also be added. Minerals may also be incorporated in the beverage of the present invention. Preferred minerals include calcium, chromium, copper, fluorine, iodine, iron, magnesium, manganese, phosphorus, selenium, silicon, molybdenum, and zinc. Of these, magnesium, phosphorus and iron are especially preferred.

Similar to general beverages, a molded package having polyethylene terephthalate as a principal component (a so-called PET bottle), a metal can, a paper container combined with a metal foil or plastic film, a bottle or the like may be used as a package for the packaged beverage of the present invention. The term "packaged beverage" as used herein means a beverage that can be consumed without dilution.

The packaged beverage of the present invention can be produced, for example, by filling the beverage in a container such as a metal can and, when heat sterilization is feasible, conducting heat sterilization under sterilization conditions as prescribed in the Food Sanitation Act of Japan. For packages, such as PET bottles and paper containers, which cannot be subjected to retort sterilization, a process of subjecting the beverage to high-temperature short-time sterilization, for example, by a plate-type heat exchanger under similar sterilization conditions to those described above, cooling the resulting beverage to a specific temperature and then filling it beverage in a package is employed. Under aseptic conditions, additional components may be filled in the container in which the beverage has already been contained. After heat sterilization under acidic conditions, the pH of the beverage may be brought back to neutral under aseptic conditions or after heat sterilization under neutral conditions, the pH of the tea beverage may be brought back to acidic under aseptic conditions.

EXAMPLES

Measurement of Non-polymer Catechins

The non-polymer catechin content of a non-polymer catechin composition, which has been diluted with distilled water and then filtered through a filter (0.8 μm), is measured by high-performance liquid chromatograph ("SCL-10AVP", product of Shimadzu Corporation) equipped with "L-Column TM ODS" (packed column for octadecyl-introduced liquid chromatograph, 4.6 mmØ×250 mm: product of Chemicals Evaluation and Research Institute, Japan) at a column temperature of 35° C. by a gradient method using Solution A and Solution B. Measurement is conducted under the following conditions: use of a distilled aqueous solution containing 0.1 mol/L of acetic acid as a mobile phase solution A and an acetonitrile solution containing 0.1 mol/L of acetic acid as a mobile phase solution B, an injection amount of a sample: 20 μL, and a wavelength of UV detector at 280 nm.

Measurement of Caffeine
(Analyzer)
HPLC (product of Hitachi, Ltd.) is employed.
Plotter: "D-2500", Detector: "L-4200"
Pump: "L-7100", Autosampler: "L-7200"
Column: "Inertsil ODS-2", 2.1 mm inner diameter 250 mm length
(Analytical conditions)
Injection amount of sample: 10 μL, flow rate: 1.0 mL/min
Detection wavelenght of ultraviolet absorptiometer: 280 nm
Eluent A: 0.1 mol/L aqueous acetic solution, Eluent B: a 0.1 mol/L acetic acid in acetonitrile solution

| Concentration gradient conditions (vol. %) | | |
|---|---|---|
| Time (min) | Eluent A | Eluent B |
| 0 | 97 | 3 |
| 5 | 97 | 3 |
| 37 | 80 | 20 |
| 43 | 80 | 20 |
| 43.5 | 0 | 100 |
| 48.5 | 0 | 100 |
| 49 | 97 | 3 |
| 62 | 97 | 3 |

(Retention time of caffeine
Caffeine: 27.2 minutes
From each area % determined here, the mass % is determined based on the standard substance.
Measurement of Haze
A sample provided for measurement is a 10 mass %, in term of non-polymer catechins (A), aqueous solution of a purified green-tea extract. The haze (H) is measured using a haze and reflectometer meter ("HR-100") of Murakami Color Researcher Laboratory and filling a glass cell (optical path length; 10 mm, 35 mm×40 mm) with a packaged beverage. The measurement temperature is 25° C. The haze falls within a range of from 0 to 100 and that of water is 0.
Assessment of Color
(Analyzer)
The purified green-tea extract is diluted with ion exchange water to give a catechin concentration of 180 mg/100 mL and the appearance of the sample is visually assessed.
Visual Assessment of Stability
The purified green-tea extract is diluted with ion exchange water to give a non-polymer catechin concentration of 100 mg/100 mL. The state of an assessment sample filled in a 50 mL vial bottle is observed on an illuminator and visually assessed.
Measurement of Protein and Free Amino Acid
Calculating formula of (the amount of protein+free amino acid): (total nitrogen in the purified green-tea extract−caffeine nitrogen)×conversion factor
Determination Method of Total Nitrogen:
Total nitrogen is determined by the nitrogen determination conversion method (macro Kjeldahl method) in accordance with the analysis method of nutrients in nutritional labeling standards (Notification No. 146 of the Ministry of Health, Labour and Welfare issued May 1996) (a method presented in the third column of the first appendix of Nutritional labeling Standards).
Caffeine Nitrogen:
Caffeine nitrogen is determined by converting the amount of caffeine as determined by the above-described measurement of caffeine into the nitrogen molecular weight (Mw=54) in the molecular weight of caffeine (Mw=194).

Conversion Coefficient:
A conversion coefficient (6.25) in accordance with the analysis method of nutrients in nutritional labeling standards (Notification No. 146 of the Ministry of Health, Labour and Welfare issued May 1996) (a method presented in the third column of the first appendix of Nutritional labeling Standards) is used.
Measurement of Turbidity
(Analyzer)
Turbiditimeter ("TN-100", product of EUTECH INSTRUMENTS)
Wavelength range: 850 nm
Method: 90° transmission scattering comparison system
A solution obtained by bringing the green tea extract into contact with a mixed solution of an organic solvent and water and active carbon and/or acid clay or active clay, adding water to the resulting solution and/or removing the organic solvent from the mixed solution, and separating the turbidity component thus precipitated is diluted with ion exchange water to give a non-polymer catechin concentration of 4 mass %. The solution thus obtained is provided as a sample for measurement.
The purified green-tea extract is diluted with ion exchange water to give a non-polymer catechin concentration of 15 mass % and measurement is conducted using the solution as a sample.

Example 1

Purified Green-tea Extract A

Under stirring conditions of normal temperature and 250 r/min, 200 g of a green tea extract ("Polyphenone HG", product of Tokyo Food Techno) was dispersed in 800 g of a 95 mass % aqueous ethanol solution. After 100 g of acid clay "Mizuka Ace #600" (product of Mizusawa Industrial Chemicals) was charged in the resulting dispersion, stirring was continued for about 10 minutes. The reaction mixture was then filtered through a No. 2 filter paper. To the resulting solution was added 433 g of ion exchange water and stirring was continued for about 5 minutes at room temperature. The turbidity component thus precipitated was separated by a membrane filter. To the solution thus separated was added 20 g of active carbon. The mixture was filtered through a No. 2 filter paper again, followed by re-filtration through a 0.2 μm membrane filter. Ethanol was distilled off at 40° C. and 0.0272 kg/cm$^2$ and a catechin concentration was adjusted with ion exchange water, whereby purified green-tea extract A was obtained.

The non-polymer catechin content was 22 mass % after the treatment.
The haze of a 10 mass % aqueous solution, in terms of non-polymer catechins (A), of the purified green-tea extract after the treatment was 10.
The mass ratio of caffeine/non-polymer catechins after the treatment was 0.03.
The percentage of gallates after the treatment was 51 mass %.

Example 2

Purified Green-tea Extract B

Under stirring conditions of normal temperature and 250 r/min, 200 g of a green tea extract ("Polyphenone HG", product of Tokyo Food Techno) was dispersed in 800 g of a 95 mass % aqueous ethanol solution. After 16 g of active carbon "KURARAY COAL GLC" (product of Kuraray Chemical) and 30 g of acid clay "Mizuka Ace #600" (product of Mizusawa Industrial Chemicals) were charged in the resulting dispersion, stirring was continued for about 10 minutes. The reaction mixture was then filtered through a No. 2 filter paper, followed by re-filtration of the active carbon and acid clay through a 0.2 μm membrane filter. Ethanol was distilled off at 40° C. and 0.0272 kg/cm$^2$. The residue was filtered to separate the turbidity component thus precipitated. A catechin concentration was adjusted with ion exchange water, whereby purified green-tea extract B was obtained.

The non-polymer catechin content was 22 mass % after the treatment.

The haze of a 10 mass % aqueous solution, in terms of non-polymer catechins (A), of the purified green-tea extract after the treatment was 1.

The mass ratio of caffeine/non-polymer catechins after the treatment was 0.05.

The percentage of gallates after the treatment was 51.2 mass %.

Comparative Example 1

Green Tea Extract C

Under stirring conditions of normal temperature and 250 r/min, 200 g of a green tea extract ("Polyphenone HG", product of Tokyo Food Techno) was dispersed in 800 g of a 95 mass % aqueous ethanol solution. After 100 g of acid clay "Mizuka Ace #600" (product of Mizusawa Industrial Chemicals) was charged in the resulting dispersion, stirring was continued for about 10 minutes. The reaction mixture was then filtered through a No. 2 filter paper. To the resulting solution was added 16 g of active carbon and the mixture was filtered again through a No. 2 filter paper. The residue was re-filtered through a 0.2 μm membrane filter to remove the turbidity. Ethanol was distilled off at 40° C. and 0.0272 kg/cm$^2$ and a catechin concentration was adjusted with ion exchange water, whereby purified green-tea extract C was obtained.

The non-polymer catechin content was 22 mass % after the treatment.

The haze of a 10 mass % aqueous solution, in terms of non-polymer catechins (A), of the purified green-tea extract after the treatment was 75.

The mass ratio of caffeine/non-polymer catechins after the treatment was 0.05.

The percentage of gallates after the treatment was 51 mass %.

Comparative Example 2

Green Tea Extract D

Under stirring conditions of normal temperature and 250 r/min, 200 g of a green tea extract ("Polyphenone HG", product of Tokyo Food Techno) was dispersed in 800 g of a 95 mass % aqueous ethanol solution. After 100 g of acid clay "Mizuka Ace #600" (product of Mizusawa Industrial Chemicals) was charged in the resulting dispersion, stirring was continued for about 10 minutes. The reaction mixture was then filtered through a No. 2 filter paper. To the resulting solution was added 16 g of active carbon. The mixture was filtered through a No. 2 filter paper again, followed by re-filtration through a 0.2 μm membrane filter. To the resulting solution was added 433 g of ion exchange water and stirring was continued for about 5 minutes at room temperature. Without any separating operation of the turbidity component thus precipitated, ethanol was distilled off at 40° C. and 0.0272 kg/cm$^2$ and a catechin concentration was adjusted with ion exchange water, whereby purified green-tea extract D was obtained.

The non-polymer catechin content was 22 mass % after the treatment.

The haze of a 10 mass % aqueous solution, in terms of non-polymer catechins (A), of the purified green-tea extract after the treatment was 72.

A mass ratio of caffeine/non-polymer catechins after the treatment was 0.05.

The percentage of gallates after the treatment was 51 mass %.

Measurement results of the purified green tea extracts prepared in Examples 1 and 2, and Comparative Examples 1 and 2 are shown in Table 1.

TABLE 1

|  | The present invention | | Comp. Ex. 1 | Comp. Ex. 2 |
| --- | --- | --- | --- | --- |
|  | Example 1 | Example 2 | | |
| Green tea extract (solid) (g)[1] | 200 | 200 | 200 | 200 |
| Ethanol (g) | 760 | 760 | 760 | 760 |
| Water (g) | 40 | 40 | 40 | 40 |
| Active carbon (g)[2] | 20 | 16 | 16 | 16 |
| Acid clay (g)[3] | 100 | 100 | 100 | 100 |
| Water added to precipitate turbidity component (g) | 433 | 0 | 0 | 433 |
| Amount of ethanol removed (g) | 760 | 759.5 | 760 | 760 |
| Ethanol/water after treatment with clay (mass ratio) | 95/5 | 95/5 | 95/5 | 95/5 |
| Ethanol/water at the time of separation (mass ratio) | 62/38 | 1/99 | 95/5 | 60/40 |
| Separation means of precipitated turbidity | Filter | Filter | Filter | — |
| Non-polymer catechins after treatment (mass %)[4] | | | | |
| GC | 6.3 | 6.5 | 6.8 | 6.0 |
| EGC | 29.7 | 29.4 | 29.4 | 29.9 |
| C | 2.0 | 2.1 | 2.2 | 2.1 |
| EC | 9.9 | 9.9 | 9.9 | 9.9 |
| EGCg | 37.7 | 37.5 | 37.3 | 38.1 |
| GCg | 1.3 | 1.4 | 1.4 | 1.1 |
| ECg | 12.1 | 12.1 | 11.9 | 11.9 |

TABLE 1-continued

|  | The present invention | | | |
|---|---|---|---|---|
|  | Example 1 | Example 2 | Comp. Ex. 1 | Comp. Ex. 2 |
| Cg | 1.1 | 1.2 | 1.0 | 1.0 |
| Concentration of non-polymer catechins in the solid content after treatment (mass %) | 65 | 65 | 64 | 63 |
| Haze of a 10 mass % aqueous solution of non-polymer catechins after treatment | 10 | 1 | 75 | 72 |
| caffeine/non-polymer catechins after treatment (mass ratio) | 0.03 | 0.05 | 0.05 | 0.05 |
| Percentage of gallates in non-polymer catechins after treatment (mass %) | 51 | 51 | 51 | 51 |
| Percentage of gallo-catechins in non-polymer catechins after treatment (mass %) | 75 | 75 | 75 | 75 |
| Assessment of purified product | No turbidity observed and good color | No turbidity observed and good color | Turbidity observed and poor color | Turbidity observed and poor color |

(Note)
[1]"Polyphenon HG" (product of Tokyo Food Techno)
[2]"KURARAY COAL GLC" (product of Kuraray Chemical)
[3]"Mizuka Ace #600" (product of Mizusawa Industrial Chemicals)
[4]Non-polymer catechin composition of Polyphenon HG preparation: 6.39 mass % of GC (gallocatechin), 29.42 mass % of EGC (epigallocatechin), 2.16 mass % of C (catechin), 10.3 mass % of EC (epicatechin), 37.13 mass % of EGCg (epigallocatechin gallate), 1.93 mass % of GCg (gallocatechin gallate), 11.89 mass % of ECg (epicatechin gallate), and 0.79 mass % of Cg (catechin gallate). The percentage of gallates: 51.73 mass %.

The preparation process of the present invention makes it possible to prepare a purified green-tea extract having a reduced caffeine content and a reduced turbidity component without changing the percentage of gallates in non-polymer catechins.

Example 3

Non-tea-based Packaged Beverage

After addition of the purified green-tea extract as shown in Table 1 and package beverage components as shown in Table 2, a beverage was prepared by adding the balance of ion exchange water. The resulting beverage was subjected to sterilization treatment in accordance with the Food Sanitation Act and hot pack filling, whereby a non-tea-based packaged beverage was obtained.

After the non-tea-based packaged beverage thus prepared was stored at 37° C. for 30 days, a panel of thirty male experts was asked to take the beverage and also the non-tea-based packaged beverage just after preparation, each 500 mL, once and to assess a change of rough taste (rough taste derived from turbidity after long-term storage) compared with the taste of the beverage just after preparation based on the below-described standards. The temperature of the beverage at the time of drinking was adjusted to room temperature. A change in appearance of the beverage after storage was also assessed. The results are shown in Table 2.

Change in Appearance
A: There occurs no change in appearance including precipitation.
B: There occurs a slight change in appearance including precipitation.
C: There occurs a change in appearance including precipitation.
D: There occurs a great change in appearance including precipitation.

Change in Rough Taste:
A: Almost no change is observed.
B: A slight change is observed.
C: A change is observed.
D: A great change is observed.

TABLE 2

|  | Invention Products | | Comparative Products | |
|---|---|---|---|---|
|  | 3 | 4 | 3 | 4 |
| Purified green-tea extract A: Invention product 1 | 1.00 | — | — | — |
| Purified green-tea extract B: Invention product 2 | — | 1.00 | — | — |
| Green tea extract: Comp. Ex. 1 |  |  | 1.0 |  |
| Green tea extract: Comp. Ex. 2 |  |  |  | 1.0 |
| Ascorbic acid | 0.03 | 0.03 | 0.03 | 0.03 |
| Citric acid | 0.2 | 0.2 | 0.2 | 0.2 |
| Trisodium citrate | 0.1 | 0.1 | 0.1 | 0.1 |
| Glucose | — | 2.00 | — | 2.00 |
| Artificial sweetener | 5.00 | 3.00 | 5.00 | 3.00 |
| Sodium chloride | 0.05 | 0.05 | 0.05 | 0.05 |
| Potassium chloride | 0.02 | 0.02 | 0.02 | 0.02 |
| Flavor component | 0.10 | 0.10 | 0.10 | 0.10 |
| Ion exchange water | Balance | Balance | Balance | Balance |
| Total amount | 100 | 100 | 100 | 100 |
| pH of beverage | 3.5 | 3.5 | 3.5 | 3.5 |
| Non-polymer catechins (mass %) | 0.22 | 0.22 | 0.22 | 0.22 |
| Change in appearance after storage of beverage | A | A | D | D |
| Change in rough taste after storage of beverage | A | A | D | D |

The packaged beverages of the present invention were each clear without appearance change and when they were stored for a long period of time, no change in rough taste was observed.

Example 4

Non-Tea-Based Packaged Beverage

After addition of the purified green-tea extract shown in Table 1 and the packaged beverage component shown in Table 2, the balance of ion exchange water was added to prepare a beverage. The resulting beverage was sterilized in accordance with the Food Sanitation Act, whereby a tea-based packaged beverage was obtained.

After the tea-based packaged beverage thus prepared was stored at 37° C. for 30 days, a panel of thirty male experts was asked to take the beverage and also the tea-based packaged beverage just after preparation, each 500 mL, once and to assess freshness of aroma specific to green tea compared with that just after preparation based on the below-described standards. The temperature of the beverage at the time of drinking was adjusted to room temperature. A change in appearance of the beverage after storage was also assessed. The results are shown in Table 3.

Change in Appearance

A: There occurs no change in appearance including precipitation.
B: There occurs a slight change in appearance including precipitation.
C: There occurs a change in appearance including precipitation.
D: There occurs a great change in appearance including precipitation. Change in freshness of aroma specific to green tea
A: Almost no change is observed.
B: A slight change is observed.
C: A change is observed.
D: A great change is observed.

TABLE 3

|  | Invention Products | Comparative Products | |
| --- | --- | --- | --- |
|  | 5 | 5 | 6 |
| Purified green-tea extract: Example 1 | 0.48 | — | — |
| Green tea extract: Comparative Example 1 | — | 0.48 | — |
| Green tea extract: Comparative Example 2 | — | — | 0.48 |
| Green tea extract* | 20 | 20 | 20 |
| pH regulator | Balance | Balance | Balance |
| Flavor component | 0.10 | 0.10 | 0.10 |
| Ion exchange water | Balance | Balance | Balance |
| Total amount | 100 | 100 | 100 |
| pH of beverage | 6.1 | 6.2 | 6.2 |
| Non-patent catechins (mass %) | 0.20 | 0.22 | 0.22 |
| Change in appearance after storage of beverage | A | C | C |
| Change in freshness of aroma after storage of beverage | A | D | D |

*Green tea extract obtained by adding 50 g of green tea leaves to 1 kg of ion exchange water maintained at 90° C. under heat, extracting for 8 minutes and then filtering through a flannel filter cloth while cooling by a heat exchanger.

Example 5

Purified Green-tea Extract E

Under the stirring conditions of normal temperature and 250 r/min, 1000 g of acid clay ("Mizuka Ace #600", product of Mizusawa Industrial Chemicals) was dispersed in 8000 g of a 92.4 mass % aqueous ethanol solution. After stirring for about 10 minutes, 2000 g of a green tea extract ("Polyphenon HG", product of Tokyo Food Techno) was charged and stirring was continued for about 3 hours at a temperature kept at room temperature (pH 4.0). The reaction mixture was filtered through a No. 2 filter paper. To the resulting solution was added 4170 g of ion exchange water and the mixture was stirred for about 5 minutes under the stirring conditions of room temperature and 100 r/min. The resulting mixed solution was fed to a disc type centrifugal separator ("ADS250AS, product of Saito Enshinki Kogyo, equivalent sedimentation area: 1440 m$^2$) under the conditions of 15° C., Q/Σ=2.1×10$^{-5}$ m/h to separate a turbidity component thus precipitated. The solution thus separated was brought into contact with 300 g of active carbon ("KURARAY COAL GLC", product of Kuraray Chemical), followed by filtration through a 0.2 μm membrane filter. In the final stage, the water content of the solution was adjusted by adding thereto 2000 g of ion exchange water and distilling off ethanol at 40° C. and 0.0272 kg/cm$^2$, whereby the purified green-tea extract E was obtained. It had a non-polymer catechin content of 15 mass % after the treatment.
Turbidity after the treatment=21
A non-polymer catechin/caffeine mass ratio after the treatment=50.0
Percentage of gallates after the treatment: 53.0 mass %

Example 6

Purified Green-tea Extract F

Under the stirring conditions of normal temperature and 250 r/min, 100 g of acid clay ("Mizuka Ace #600", product of Mizusawa Industrial Chemicals) was dispersed in 800 g of a 92.4 mass % aqueous ethanol solution. After stirring for about 10 minutes, 200 g of a green tea extract ("Polyphenon HG", product of Tokyo Food Techno) was charged and stirring was continued for about 3 hours at a temperature kept at room temperature (pH 4.1). The reaction mixture was filtered through a No. 2 filter paper. To the resulting solution was added 417 g of ion exchange water and the mixture was stirred for about 5 minutes under the stirring conditions of room temperature and 100 r/min. To the resulting mixed solution was added 25.6 g of diatomaceous earth ("Radiolite 800S" product of Showa Chemical Industry) and stirring was continued for about 5 minutes at a temperature kept at room temperature. The reaction mixture was fed to a filter (0.00385 m$^2$) precoated, to give a thickness of 20 mm, with diatomaceous earth ("Radiolite 800S" product of Showa Chemical Industry) on a No. 2 filter paper and filtered under pressure of 0.18 Mpa and at a space velocity of 3000 L/m$^2$·hr to separate the turbidity component thus precipitated (separation temperature: 25° C.). The solution thus separated was brought into contact with 30 g of active carbon ("KURARAY COAL GLC", product of Kuraray Chemical), followed by filtration through a 0.2 μm membrane filter. In the final stage, the water content of the solution was adjusted by adding 200 g of ion exchange water thereto and distilling off ethanol at 40° C. and 0.0272 kg/cm$^2$, whereby the purified green-tea extract F was obtained.
It had a non-polymer catechin content of 15 mass % after the treatment.
Turbidity after the treatment=7
A non-polymer catechin/caffeine mass ratio after the treatment=52.6
Percentage of gallates after the treatment: 53.2 mass %

Example 7

Purified Green-tea Extract G

Under the stirring conditions of normal temperature and 250 r/min, 1000 g of acid clay ("Mizuka Ace #600", product of Mizusawa Industrial Chemicals) was dispersed in 8000 g of a 92.4 mass % aqueous ethanol solution. After stirring for about 10 minutes, 2000 g of a green tea extract ("Polyphenon HG", product of Tokyo Food Techno) was charged and stirring was continued for about 3 hours at a temperature kept at room temperature (pH 4.0). The reaction mixture was filtered through a No. 2 filter paper. From the resulting solution, 3255 g of ethanol was distilled off at 40° C. and 0.0272 kg/cm$^2$ and then, 2000 g of ion exchange water was added to the residue.

The mixture was stirred for about 5 minutes under the stirring conditions of room temperature and 100 r/min. The resulting mixed solution was fed to a disc type centrifugal separator ("ADS250AS, product of Saito Enshinki Kogyo, equivalent sedimentation area: 1440 m²) under the conditions of room temperature, Q/Σ=2.1×10⁻⁵ m/h to separate a turbidity component thus precipitated. The solution thus separated was brought into contact with 300 g of active carbon ("KURARAY COAL GLC", product of Kuraray Chemical), followed by filtration through a 0.2 μm membrane filter. In the final stage, the water content of the solution was adjusted by adding thereto 2000 g of ion exchange water and distilling off ethanol at 40° C. and 0.0272 kg/cm², whereby the purified green-tea extract G was obtained.

It had a non-polymer catechin content of 15 mass % after the treatment.
Turbidity after the treatment=32
A non-polymer catechin/caffeine mass ratio after the treatment=47.6
Percentage of gallates after the treatment: 52.6 mass %

Comparative Example 3

Under the stirring conditions of normal temperature and 250 r/min, 100 g of acid clay ("Mizuka Ace #600", product of Mizusawa Industrial Chemicals) was dispersed in 800 g of a 92.4 mass % aqueous ethanol solution. After stirring for about 10 minutes, 200 g of a green tea extract ("Polyphenon HG", product of Tokyo Food Techno) was charged and stirring was continued for about 3 hours at a temperature kept at room temperature (pH 4.3). The reaction mixture was filtered through a No. 2 filter paper. The resulting solution was brought into contact with 30 g of active carbon ("KURARAY COAL GLC", product of Kuraray Chemical), followed by filtration through a 0.2 μm membrane filter. In the final stage, the water content of the solution was adjusted by adding thereto 200 g of ion exchange water and distilling off ethanol at 40° C. and 0.0272 kg/cm², whereby the product of Comparative Example 3 was obtained.

It had a non-polymer catechin content of 15 mass % after the treatment.
Turbidity after the treatment=314
A non-polymer catechin/caffeine mass ratio after the treatment=52.2
Percentage of gallates after the treatment: 52.6 mass %

Comparative Example 4

Under the stirring conditions of normal temperature and 250 r/min, 100 g of acid clay ("Mizuka Ace #600", product of Mizusawa Industrial Chemicals) was dispersed in 800 g of a 92.4 mass % aqueous ethanol solution. After stirring for about 10 minutes, 200 g of a green tea extract ("Polyphenon HG", product of Tokyo Food Techno) was charged and stirring was continued for about 3 hours at a temperature kept at room temperature (pH 4.1). The reaction mixture was then filtered through a No. 2 filter paper. To the resulting solution was added 417 g of ion exchange water and the mixture was stirred for about 5 minutes under stirring conditions of room temperature and 100 r/min. The resulting solution was brought into contact with 30 g of active carbon ("KURARAY COAL GLC", product of Kuraray Chemical), followed by filtration through a 0.2 μm membrane filter. In the final stage, the water content of the solution was adjusted by adding thereto 200 g of ion exchange water and then distilling off ethanol at 40° C. and 0.0272 kg/cm², whereby the product of Comparative Example 4 was obtained.

It had a non-polymer catechin content of 15 mass % after the treatment.
Turbidity after the treatment=178
A non-polymer catechin/caffeine mass ratio after the treatment=49.8
Percentage of gallates after the treatment: 52.9 mass %

Preparation conditions in Examples 5 to 7 and analysis results of the green tea extracts obtained under the conditions are shown in Table 4, while preparation conditions in Comparative Examples 3 and 4 and green tea extracts obtained under the conditions are shown in Table 5.

TABLE 4

|  | Example 5 | Example 6 | Example 7 |
|---|---|---|---|
| Green tea extract (solid) (g)[1] | 2,000 | 200 | 2,000 |
| Ethanol (g) | 7,392 | 739.2 | 7,392 |
| Water (g) | 608 | 60.8 | 608 |
| Active carbon (g)[2] | 300 | 30 | 300 |
| Acid clay (g)[3] | 1,000 | 100 | 1,000 |
| Organic solvent/water after treatment with clay (mass ratio) | 92/8 | 92/8 | 92/8 |
| Amount of water added to precipitate turbidity (g) | 4,170 | 417 | 2,000 |
| Amount of organic solvent removed to precipitate turbidity (g) | 0 | 0 | 3,255 |
| Organic solvent/water when turbidity component is precipitated (mass ratio) | 60/40 | 60/40 | 60/40 |
| Separation means of precipitated turbidity | Centrifugal separation | Precoat filtration | Centrifugal separation |
| Amount of filter aid added for separation (g)[4] | 0 | 25.6 | 0 |
| Turbidity of clear solution after separation of precipitated turbidity (NTU) | 15 | 1 | 45 |
| Non-polymer catechins after treatment (mass %)[5] |  |  |  |
| GC | 7.00 | 7.20 | 7.05 |
| EGC | 29.65 | 29.30 | 30.05 |
| C | 2.93 | 2.94 | 2.94 |
| EC | 7.43 | 7.39 | 7.34 |
| EGCg | 39.78 | 39.93 | 39.59 |
| GCg | 2.21 | 2.25 | 2.23 |
| ECg | 10.08 | 10.09 | 9.95 |
| Cg | 0.92 | 0.90 | 0.85 |
| Non-polymer catechins/caffeine after treatment (mass ratio) | 50.0 | 52.6 | 47.6 |

TABLE 4-continued

|  | Example 5 | Example 6 | Example 7 |
|---|---|---|---|
| Percentage of gallates in non-polymer catechins after treatment (mass %) | 53.0 | 53.2 | 52.6 |
| Percentage of gallo-catechins in non-polymer catechins after treatment (mass %) | 78.6 | 78.7 | 78.9 |
| Concentration of non-polymer catechins in the solid content after treatment (mass %) | 65 | 65 | 65 |
| Turbidity of purified product (NTU) | 21 | 7 | 32 |
| Assessment of purified product | No turbidity observed, good color and good stability | No turbidity observed, good color and good stability | No turbidity observed, good color and good stability |

(Note)
[1] "Polyphenon HG" (product of Tokyo Food Techno)
[2] "KURARAY COAL GLC" (product of Kuraray Chemical)
[3] "Mizuka Ace #600" (product of Mizusawa Industrial Chemicals)
[4] "Radiolite #800S" (product of Showa Chemical Industry)
[5] Non-polymer catechin composition of Polyphenon HG preparation: 6.39 mass % of GC (gallocatechin), 29.42 mass % of EGC (epigallocatechin), 2.16 mass % of C (catechin), 10.3 mass % of EC (epicatechin), 37.13 mass % of EGCg (epigallocatechin gallate), 1.93 mass % of GCg (gallocatechin gallate), 11.89 mass % of ECg (epicatechin gallate) and 0.79 mass % of Cg (catechin gallate). The percentage of gallates: 51.73 mass % and percentage of gallo catechins: 74.88 mass %.

TABLE 5

|  | Comp. Ex. 3 | Comp. Ex. 4 |
|---|---|---|
| Green tea extract (solid) (g)[1] | 200 | 200 |
| Ethanol (g) | 739.2 | 739.2 |
| Water (g) | 60.8 | 60.8 |
| Active carbon (g)[2] | 30 | 30 |
| Acid clay (g)[3] | 100 | 100 |
| Organic solvent/water after treatment with clay (mass ratio) | 92/8 | 92/8 |
| Amount of water added to precipitate turbidity (g) | 0 | 417 |
| Amount of organic solvent removed to precipitate turbidity (g) | 0 | 0 |
| Organic solvent/water when turbidity component is precipitated (mass ratio) | 92/8 | 60/40 |
| Separation means of precipitated turbidity | — | — |
| Amount of filter aid added for separation (g)[4] | 0 | 0 |
| Turbidity of clear solution after separation of precipitated turbidity (NTU) | — | 587 |
| Non-polymer catechins after treatment (mass %)[5] |  |  |
| GC | 7.06 | 7.04 |
| EGC | 30.07 | 29.77 |
| C | 2.95 | 2.95 |
| EC | 7.37 | 7.38 |
| EGCg | 39.54 | 39.80 |
| GCg | 2.22 | 2.23 |
| ECg | 9.94 | 9.98 |
| Cg | 0.85 | 0.85 |
| Non-polymer catechins/caffeine after treatment (mass ratio) | 52.2 | 49.8 |
| Percentage of gallates in non-polymer catechins after treatment (mass %) | 52.6 | 52.9 |
| Percentage of gallo-catechins in non-polymer catechins after treatment (mass %) | 78.9 | 78.8 |
| Concentration of non-polymer catechins in the solid content after treatment (mass %) | 65 | 65 |
| Turbidity of purified product (NTU) | 314 | 178 |
| Assessment of purified product | Turbidity observed and poor color | Turbidity observed and poor color |

(Note)
[1] "Polyphenon HG" (product of Tokyo Food Techno)
[2] "KURARAY COAL GLC" (product of Kuraray Chemical)
[3] "Mizuka Ace #600" (product of Mizusawa Industrial Chemicals)
[4] "Radiolite 800S" (product of Showa Chemical Industry)
[5] Non-polymer catechin composition of Polyphenon HG preparation: 6.39 mass % of GC (gallocatechin), 29.42 mass % of EGC (epigallocatechin), 2.16 mass % of C (catechin), 10.3 mass % of EC (epicatechin), 37.13 mass % of EGCg (epigallocatechin gallate), 1.93 mass % of GCg (gallocatechin gallate), 11.89 mass % of ECg (epicatechin gallate) and 0.79 mass % of Cg (catechin gallate). The percentage of gallates: 51.73 mass % and percentage of gallo catechins: 74.88 mass %.

As shown in Tables 4 and 5, the preparation process of the present invention makes it possible to prepare a purified green-tea extract having a reduced caffeine content and a reduced turbidity component without changing the percentage of gallates or gallo-catechins in the non-polymer catechins.

Example 8

Packaged Beverage

After addition of the purified green-tea extracts shown in Tables 4 and 5 and packaged beverage components as shown in Table 6, the balance of ion exchange water was added to prepare a beverage. The beverage was subjected to sterilization in accordance with the Food Sanitation Act and hot pack filling, whereby a packaged beverage was obtained.

After the packaged beverage thus prepared was stored at 37° C. for 30 days, a panel of five male experts was asked to take a single drink of the beverage and also a single drink of the packaged beverage just after preparation, each 500 mL and assess a change of rough taste (rough taste derived from turbidity after long-term storage) compared with the taste just after preparation based on the below-standards. The temperature of the beverage at the time of drinking was adjusted to room temperature. A change in appearance of the beverage after storage was also assessed. The results are shown in Table 6.

Change in Appearance
- A: There occurs no change in appearance including precipitation.
- B: There occurs a slight change in appearance including precipitation.
- C: There occurs a change in appearance including precipitation.
- D: There occurs a great change in appearance including precipitation.

Change in Rough Taste:
- A: Almost no change is observed.
- B: A slight change is observed.
- C: A change is observed.
- D: A great change is observed.

TABLE 6

|  | Invention Products | | Comparative Products | |
| --- | --- | --- | --- | --- |
|  | 6 | 7 | 7 | 8 |
| Purified green-tea extract E obtained in Example 5 | 1.00 | — | — | — |
| Purified green-tea extract F obtained in Example 6 | — | 1.00 | — | — |
| Green tea extract obtained in Comp. Ex. 3 | | | 1.00 | |
| Green tea extract obtained in Comp. Ex. 4 | | | — | 1.00 |
| Ascorbic acid | 0.03 | 0.03 | 0.03 | 0.03 |
| Citric acid | 0.2 | 0.2 | 0.2 | 0.2 |
| Trisodium citrate | 0.1 | 0.1 | 0.1 | 0.1 |
| Glucose | — | 2.00 | — | 2.00 |
| Artificial sweetener | 5.00 | 5.00 | 5.00 | 5.00 |
| Sodium chloride | 0.05 | 0.05 | 0.05 | 0.05 |
| Potassium chloride | 0.02 | 0.02 | 0.02 | 0.02 |
| Flavor component | 0.10 | 0.10 | 0.10 | 0.10 |
| Ion exchange water | Balance | Balance | Balance | Balance |
| Total amount | 100 | 100 | 100 | 100 |
| pH of beverage | 3.5 | 3.5 | 3.5 | 3.5 |
| Non-polymer catechins (mass %) | 0.22 | 0.22 | 0.22 | 0.22 |
| Change in appearance after storage of beverage | A | A | D | D |
| Change in rough taste after storage of beverage | A | A | D | D |

As is apparent from the results shown in Table 6, the packaged beverages using the purified green-tea extract obtained by treating the green tea extract according to the present invention did not undergo any change in appearance and was clear even after long term storage and in addition no change in rough taste was observed.

Example 9

(1) To 6000 g of green tea leaves was added 90 kg of hot water of 84° C. After extraction for 60 minutes, filtration was performed through a No. 2 filter paper, whereby 66 kg (pH 5.4) of "green tea extract" was obtained. (Non-polymer catechin concentration of the green tea extract=0.9 wt. %, percentage of the gallates in the green tea extract=52.2 mass %)

The temperature of the green tea extract was set at 25° C. and tannase ("Tannase KTFH", product of Kikkoman) was added to the green tea extract to give its concentration of 200 ppm. The resulting mixture was maintained for 130 minutes and when the percentage of gallates became 40.2 mass %, the solution was heated to 90° C. to deactivate the enzyme, whereby the reaction was terminated (pH 4.9). The reaction mixture was concentrated to the Brix concentration of 25 by using a reverse osmosis membrane ("NTR-759HR", product of Nitto Denko), whereby 8 kg of "concentrate of green tea extract treated with tannase" was obtained in the liquid form. The green tea extract thus obtained had a non-polymer catechin content of 6.9 mass %, a percentage of gallates of 40.1 mass % and pH of 5.0 in the form of an aqueous solution having a solid concentration of 2 mass %.

(2) The concentrate thus obtained (4.5 kg) was spray dried, whereby 400 g of "green tea extract treated with tannase" was obtained in the powder form. The green tea extract thus obtained had a non-polymer catechin content of 33.2 mass %, percentage of gallates of 40.1 mass % and pH of 5.0 in the form of an aqueous solution having a solid concentration of 2 mass %.

(3) The green tea extract thus obtained was purified in a similar manner to Example 2, whereby a purified green-tea extract having no turbidity, good color and reduced bitterness was obtained.

Content of non-polymer catechins after the treatment=15 mass %

Concentration of no-polymer catechins in the solid content after the treatment=65 mass %

Turbidity after the treatment=9

A non-polymer catechins/caffeine mass ratio after the treatment=37.1

Percentage of gallates after the treatment=40.4 mass %

(4) The purified green-tea extract thus obtained was treated in a similar manner to that employed for the invention product 6 in Example 8, whereby a packaged beverage was obtained. The resulting packaged beverage did not undergo a change in appearance even after long-term storage and had reduced bitterness.

The invention claimed is:

1. A process for preparing a purified green-tea extract comprising, in the solid content thereof, from 36 to 99 mass % of non-polymer catechins, which process comprises, in order,
   bringing a green tea extract into contact with a mixed solution comprising an organic solvent and water at an initial mass ratio of from 80/20 to 96.5/3.5 and acid clay or active clay, thereby forming a composition,
   filtering the composition thereby forming a green-tea extract solution;
   adding water to the green-tea extract solution whereby the organic solvent/water mass ratio in the green-tea extract solution is adjusted from the initial mass ratio to a final mass ratio of from 0.5/99.5 to 65/35,
   separating a turbidity component precipitated in the solution,
   bringing the solution after said separating into contact with active carbon, and
   removing the active carbon.

2. The preparation process according to claim 1, wherein the turbidity component thus precipitated is separated by at least one of (1) centrifugal separation and (2) filtration.

3. The preparation process according to claim 1, wherein the turbidity component is separated at −15 to 78° C.

4. The preparation process according to claim 1, wherein the organic solvent is ethanol.

5. The preparation process according to claim 1, wherein a 10 mass %, in terms of non-polymer catechins (A), aqueous solution of the green tea extract has a haze of from 0 to 40.

6. The preparation process according to claim 1, wherein the green tea extract is obtained by treatment with tannase.

* * * * *